US008726405B1

(12) United States Patent  
Bailey et al.

(10) Patent No.: US 8,726,405 B1
(45) Date of Patent: May 13, 2014

(54) TECHNIQUES FOR PROVIDING SECURITY USING A MOBILE WIRELESS COMMUNICATIONS DEVICE HAVING DATA LOSS PREVENTION CIRCUITRY

(75) Inventors: Daniel V. Bailey, Pepperell, MA (US); Robert W. Griffin, Hollis, NH (US)

(73) Assignee: EMC Corporation, Hopkinton, MA (US)

( * ) Notice: Subject to any disclaimer, the term of this patent is extended or adjusted under 35 U.S.C. 154(b) by 554 days.

(21) Appl. No.: 12/978,017

(22) Filed: Dec. 23, 2010

(51) Int. Cl.
*G06F 21/00* (2013.01)

(52) U.S. Cl.
USPC .............................................. 726/29; 726/26

(58) Field of Classification Search
None
See application file for complete search history.

(56) References Cited

U.S. PATENT DOCUMENTS

| 8,037,537 | B1 | 10/2011 | Sharma et al. | |
|---|---|---|---|---|
| 8,086,582 | B1* | 12/2011 | Wills et al. | 707/705 |
| 8,161,522 | B1* | 4/2012 | Agrawal | 726/1 |
| 8,199,965 | B1 | 6/2012 | Basavapatna et al. | |
| 2009/0254572 | A1 | 10/2009 | Redlich et al. | |
| 2010/0036779 | A1* | 2/2010 | Sadeh-Koniecpol et al. | 706/11 |
| 2010/0115614 | A1 | 5/2010 | Barile et al. | |
| 2010/0162347 | A1 | 6/2010 | Barile | |
| 2010/0306850 | A1 | 12/2010 | Barile et al. | |
| 2011/0083190 | A1* | 4/2011 | Brown et al. | 726/26 |

\* cited by examiner

*Primary Examiner* — Jung Kim
*Assistant Examiner* — Ghodrat Jamshidi
(74) *Attorney, Agent, or Firm* — BainwoodHuang

(57) ABSTRACT

A technique provides wireless communications security. The technique involves providing a mobile wireless communications apparatus (e.g., a smart phone) having DLP circuitry, and configuring the DLP circuitry to perform DLP scanning operations. The technique further involves conducting, after the DLP circuitry is configured to perform the DLP scanning operations, wireless communications sessions (e.g., a mobile phone calls) between the mobile wireless communications apparatus and external devices (e.g., wireless access points) while the DLP circuitry performs the DLP scanning operations. In some arrangements, the DLP circuitry is configured by a user to (i) allow only authorized apps to send sensitive information and/or (ii) block retransmission of the sensitive information (e.g., in the event an application containing spyware attempts to send the sensitive information to an attacker after the user has completed a legitimate transaction). Thus, the DLP circuitry protects the mobile wireless communications apparatus against illicit dissemination of sensitive information.

20 Claims, 5 Drawing Sheets

TECHNIQUES FOR PROVIDING SECURITY USING A MOBILE WIRELESS COMMUNICATIONS DEVICE HAVING DATA LOSS PREVENTION CIRCUITRY

BACKGROUND

A typical cellular telephone allows an operator to make and receive cellular phone calls through a cellular network. During such a call, the cellular telephone runs on local battery power to enable the operator to maintain the call while traveling across long distances (e.g., while traveling several miles in a vehicle through multiple cells of the cellular network).

Some cellular telephones are equipped with additional features such as a global satellite positioning (GPS) receiver, a digital camera, an electronic touch display, and so on. As a result, such cellular telephones are able to provide the operator with extra features which are common to other portable handheld devices such as a GPS locating function, the ability to take photos, text messaging, and the ability to play games, among other things.

In general, a conventional smart phone has the same handheld form factor as a simple cellular telephone. However, the smart phone allows the operator to perform certain enhanced user operations such as downloading and running user applications (or simply "user apps"), checking email, performing wireless transactions, playing music, etc.

SUMMARY

Unfortunately, there are deficiencies to conventional smart phones. For example, the user applications running on such phones may include spyware. Along these lines, a compromised smart phone may reveal particular information about the operator beyond what is typically stored on a general desktop computer such as the operator's telephone contact list, the operator's call history, the operator's movements from one location to another, and so on. Furthermore, any personally identifiable information (PII) entered by the operator (e.g., to perform a legitimate transaction or activity) is vulnerable to retransmission by a user app containing spyware to an unauthorized received device.

One approach to protecting a smart phone against a spyware attack is for the smart phone to run an antivirus application which searches the smart phone for malicious executable code, and quarantines/deactivates such malware if it is discovered. Unfortunately, such antivirus applications typically require constant antivirus updates and may consume considerable amounts of smart phone memory.

Furthermore, up to one third of all currently available user apps may employ some form of spyware. For many of these user apps, the operator may wish to run the user apps to take advantage of certain features provided and simply block release of sensitive information.

Improved techniques protect smart phones against unauthorized releases of sensitive information by scanning data, which is ready for transmission, for information satisfying certain criteria such as having a particular personally identifiable information (PII) format. Along these lines, the smart phones can be configured to restrict transmission of certain types (or classes) of data such as credit card numbers, social security numbers, account numbers, etc. but not others. To this end, data loss prevention (DLP) circuitry operates to intercept outgoing user data and possibly block the sensitive information in that data from reaching wireless transceivers of the smart phones. In some arrangements, the DLP circuitry is configured to (i) allow only authorized apps to send the sensitive information (e.g., unauthorized apps cannot send the sensitive information) and/or (ii) block retransmission of the sensitive information (e.g., sensitive information which is recently sent within a legitimate transaction cannot be resent to an unauthorized receiving device). As a result, such smart phones are able to stop illicit dissemination of sensitive information.

One embodiment is directed to a method of providing wireless communications security. The method includes providing a mobile wireless communications apparatus having DLP circuitry, and configuring the DLP circuitry to perform DLP scanning operations. The method further includes conducting, after the DLP circuitry is configured to perform the DLP scanning operations, wireless communications sessions (e.g., mobile phone calls, web browsing, etc.) between the mobile wireless communications apparatus and a set of external devices (e.g., cellular base stations, wireless access points, etc.) while the DLP circuitry performs the DLP scanning operations.

Other embodiments are directed to mobile wireless communications apparatus having DLP circuitry. Further embodiments are directed to computer program products for smart phones, as well as other techniques.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique protects against illicit dissemination of sensitive data. The technique involves providing a mobile wireless communications apparatus (e.g., a smart phone) having data loss prevention (DLP) circuitry, and configuring the DLP circuitry to perform DLP scanning operations. The technique further involves conducting, after the DLP circuitry is configured to perform the DLP scanning operations, wireless communications sessions (e.g., cellular phone calls) between the mobile wireless communications apparatus and external devices (e.g., cellular base stations) while the DLP circuitry performs the DLP scanning operations. In some arrangements, the DLP circuitry is configured by a user to (i) allow only certain applications to send sensitive information and/or (ii) block retransmission of the sensitive information.

Figure 1:
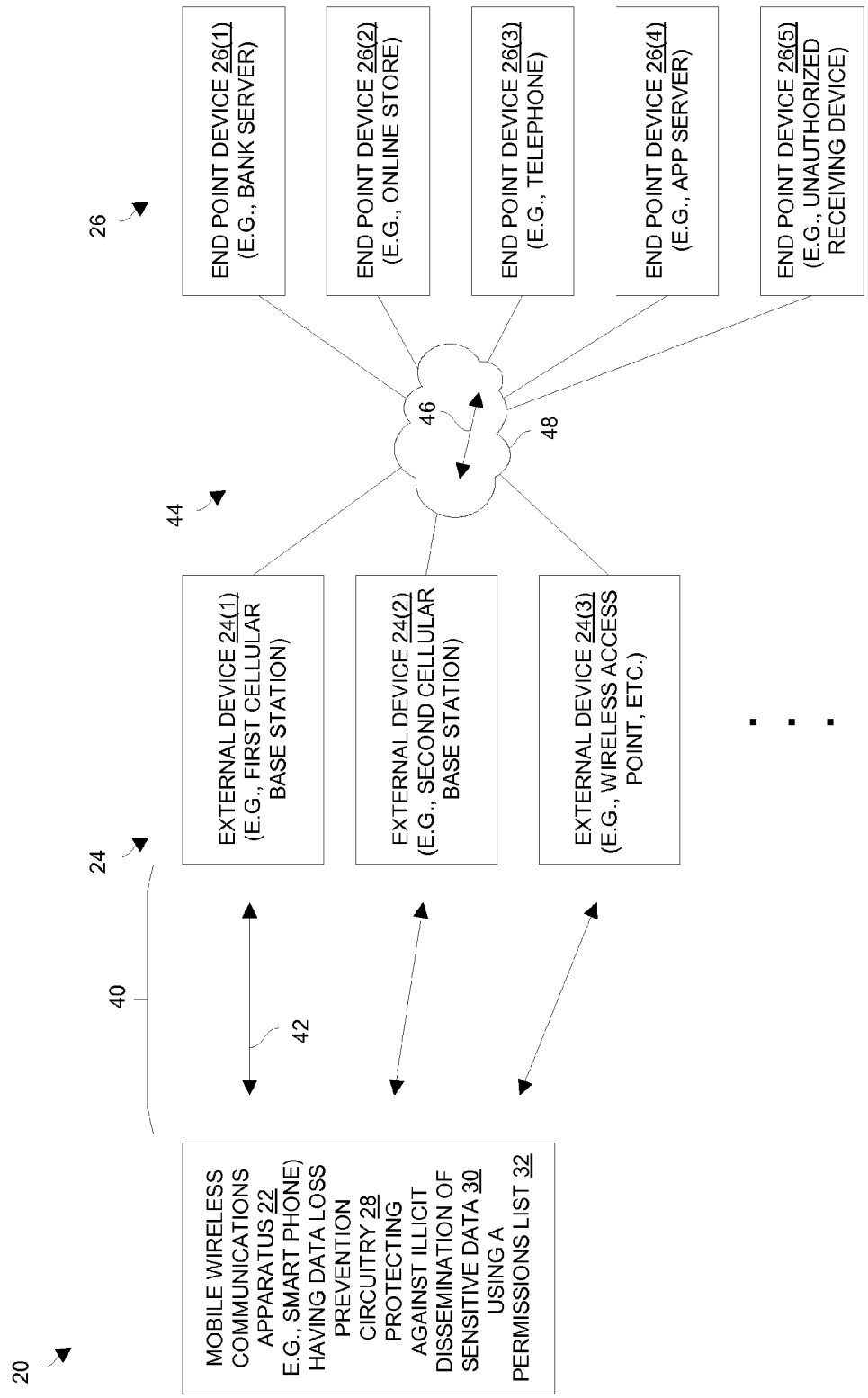
FIG. 1 is a block diagram of a wireless communications environment which enjoys protection against illicit dissemination of sensitive data using data loss prevention (DLP) circuitry.

FIG. 1 shows an electronic environment 20 which protects against illicit dissemination of sensitive information. The wireless communications environment 20 includes a mobile wireless communications apparatus 22, a set of external devices 24(1), 24(2), 24(3), . . . (collectively, external devices 24) and a set of end point devices 26(1), 26(2), 26(3), 26(4), 26(5), . . . (collectively, end point devices 26). The mobile wireless communications apparatus 22 includes, among other things, DLP circuitry 28 which is constructed and arranged to prevent unauthorized transmission of sensitive data 30 from the mobile wireless communications apparatus 22 using a permissions list 32.

As shown in FIG. 1, the mobile wireless communications apparatus 22 is constructed and arranged to communicate with the set of external devices 24 over a wireless communications medium 40 via wireless communications signals 42. The external devices 24 are distributed geographically to cover large areas (e.g., store spaces, office buildings, campuses, etc.) and/or territories (e.g., cities, counties, etc.). Such distribution of the external devices 24 and use of wireless communications signals 42 enables the mobile wireless communications apparatus 22 to conveniently roam among different coverage areas within the electronic environment 20 while maintaining access to the set of end point devices 26 through the set of external devices 24. Examples of equipment which is suitable for use as the external devices 24 include mobile/cellular telephony base stations, wireless access points, RF transceivers, infrared communications devices, combinations thereof, and the like.

As further shown in FIG. 1, the external devices 24 are constructed and arranged to communicate with the set of end point devices 26 over a communications medium 44 via communications signals 46. The communications medium 44 including a cloud 48 to indicate that at least a portion of the communications medium 44 is capable of having a variety of topologies including backbone, hub-and-spoke, loop, irregular, combinations thereof, and so on. Along these lines, the communications medium 44 may include copper-based devices and cabling, fiber optic devices and cabling, wireless devices, combinations thereof, and so on. Moreover, some portions of the communications medium 44 may include a computer network (e.g., the Internet, LANs, etc.) and other portions may include a different type of network (e.g., a cellular network, the telephone system, etc.).

One should appreciate that the electronic environment 20 is well suited for certain types of user activity such as online banking (e.g., end point device 26(1) may be a bank server), online shopping (e.g., end point device 26(2) may be an online store), cellular phone calls (e.g., end point device 26(3) may be a telephone), and downloading user apps (e.g., end point device 26(4) may be an app server), among other things. One should further appreciate that the potential exists for spyware running on the mobile wireless communications apparatus 22 to attempt to send the sensitive data 30 to an unauthorized receiving device (e.g., end point device 26(5)).

During operation of the mobile wireless communications apparatus 22, a user directs the DLP circuitry 28 through a learning phase. In particular, the DLP circuitry 28 searches the apparatus 22 for various types of sensitive information such as any data in the format of a credit card number or a social security number, a name and address, a telephone number, location information, other forms of PII, etc. To this end, the DLP circuitry 28 may be preconfigured with particular PII data formats/templates. An example of one PII data format is a credit card number format (e.g., XXXX-XXXX-XXXX-XXXX). Another example of a PII data format is a telephone number format (e.g., XXX-XXX-XXXX), and so on.

The DLP circuitry 28 then offers the user the opportunity to decide which apps are authorized to send each type of sensitive information. As the user provides this input, the DLP circuitry 28 populates the permissions list 32 which it will later refer to when operating in a normal operating mode in which the user is able to use the mobile wireless communications apparatus 22 to conduct wireless communications sessions with the external devices 24. When in this normal state, the DLP circuitry 28 performs the DLP scanning operations on outgoing data and accesses the permissions list 32 to determine whether to block discovered sensitive data 30 thus protecting against illicit dissemination of the sensitive data 30. Further details will now be provided with reference to FIG. 2.

Figure 2:
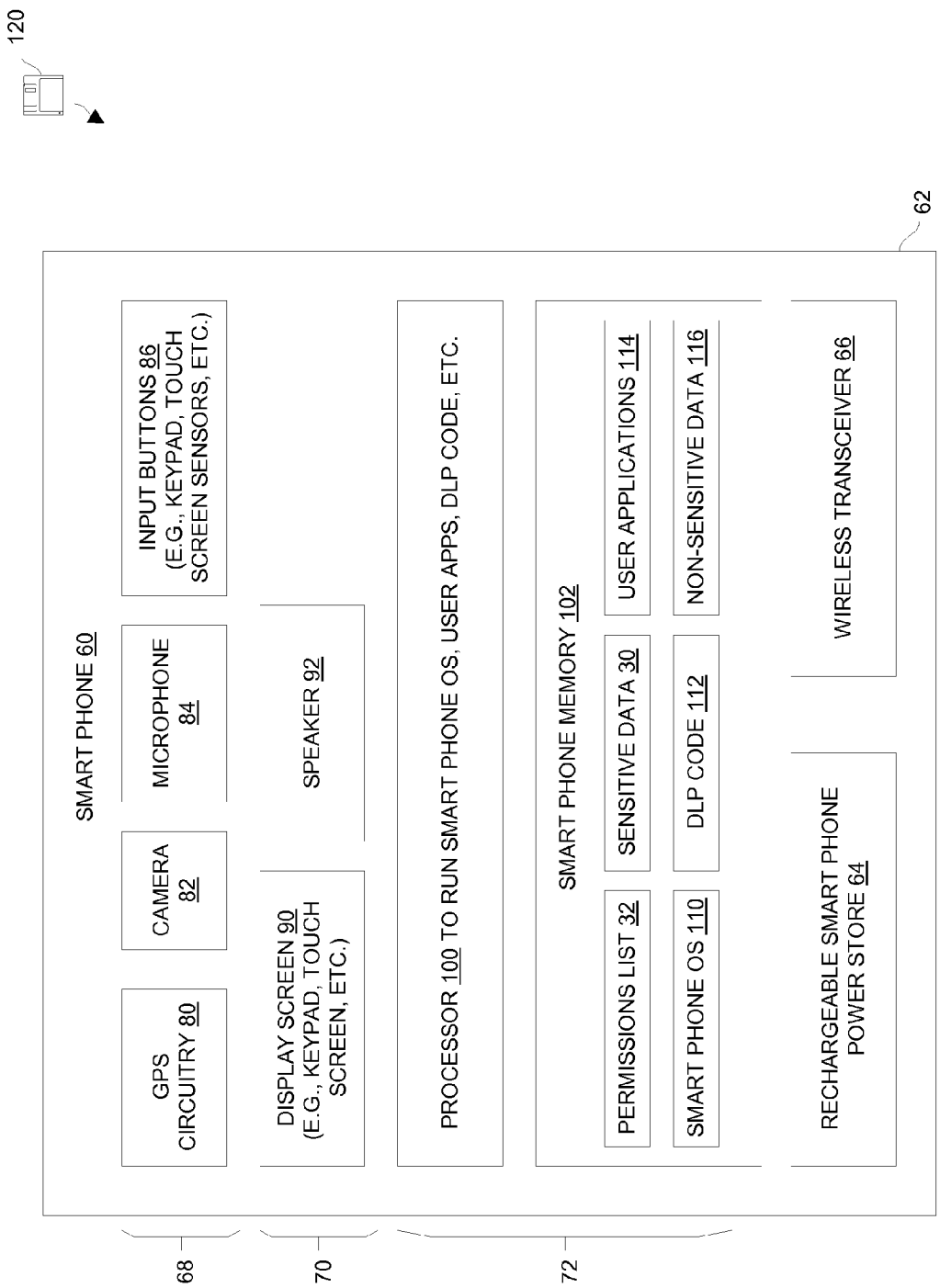
FIG. 2 is a block diagram of a mobile wireless communications apparatus having the DLP circuitry of FIG. 1.

FIG. 2 shows a smart phone 60 which is suitable for use as the mobile wireless communications apparatus 22 in FIG. 1. The smart phone 60 includes a smart phone housing 62, a rechargeable smart phone power store 64, a wireless transceiver 66, a set of input components 68, a set of user output components 70, and a smart phone controller 72.

The rechargeable smart phone power store 64 is constructed and arranged to provide power to circuitry within the smart phone 60 over the course of several days while the smart phone 60 remains in a normal operating state to receive and make calls, among other things. The wireless transceiver 66 is constructed and arranged to send wireless communications signals 42 to and receive wireless communications signals 42 from the external devices 24 (also see FIG. 1).

The set of input components 68 includes global satellite positioning (GPS) circuitry 80, a camera 82, a microphone 84, and input buttons 86 (e.g., a keypad, touch screen sensors, etc.). The smart phone 60 may include other input components 68 as well such as an external microphone adapter, a hands-free car adapter, a desktop base station adapter, and so on.

The set of user output components 70 includes an electronic display screen 90, and a speaker 92. The smart phone 60 may include other user output components 70 as well such as a wireless earpiece interface, an ear bud interface, an infrared output, a vibration ringer mechanism, and so on.

The smart phone controller 72 includes a processor 100 and memory 102. The memory 102 stores the sensitive data 30, the permissions list 32, a smart phone operating system 110, DLP code 112, user apps 114 and non-sensitive data 116.

The processor 100 is constructed and arranged to run the smart phone operating system 110, the DLP code 112, and the user applications 114 to enable the user to perform useful work (e.g., perform useful work and/or derive entertainment (e.g., to conduct phone calls, to transact business, to shop online, to play video games, etc.) while safely roaming through different wireless coverage areas provided by the external devices 24 without transmitting sensitive data 30 in an unauthorized manner.

To deploy the various memory constructs 110 through 114, a computer program product 120 having a non-transitory computer readable storage medium can be used for delivery (e.g., through a physical adapter port of the smart phone 60). Suitable forms for a non-transitory computer readable storage medium which delivers executable instructions in a non-volatile manner include CD-ROM, disk memory, tape memory, flash memory, and the like. Alternatively, one or more of the memory constructs 110 through 114 may be delivered to the smart phone 60 over the wireless communications medium 40 (also see FIG. 1).

The smart phone housing 62 supports and houses each of the smart phone components 64 through 72 to protect these components against damage. Additionally, the smart phone housing 62 enables the user to conveniently hold and operate the smart phone 60. Preferably, the smart phone housing 62 contains all of the smart phone components 64 through 72 within a convenient hand holdable form factor thus enabling the user to operate the smart phone 60 with relative ease and comfort in a variety of orientations. For example, in a first housing orientation, the user is able to effectively carry out a phone conversation with another caller using the microphone 84 and the speaker 92 properly positioned adjacent the user's head. In other housing orientations, the user is able to effectively position the smart phone 60 to take a picture, to display a video to the user, to play music while the user is walking and carrying the smart phone 60, etc.

During operation, the processor 100 runs the smart phone operating system 110, the DLP code 114 and the user applications 112 which are stored in the smart phone memory 102. The smart phone operating system 110 is constructed and arranged to manage and make available particular resources of the smart phone 60. The user apps 114 are constructed and arranged to enable the user to perform useful work and/or derive entertainment while using the smart phone 60.

The processor 100, when operating in accordance with the DLP code 112, forms the DLP circuitry 28 (FIG. 1). Such an arrangement enables effective deployment as well as provides the ability for easy upgrades. Furthermore, such an arrangement is well suited for provisioning legacy smart phone devices with the DLP circuitry 28.

As will be explained in further detail shortly, the permissions list 32 enables the DLP circuitry 28 to manage which apps 114 are authorized to send each type of sensitive information 30. Preferably, each time an entry is added to the permissions list 32 and each time the permissions list is updated 116, the permissions list 32 is saved in the smart phone memory 102 in a non-volatile manner. Further details will now be provided with reference to FIG. 3.

Figure 3:
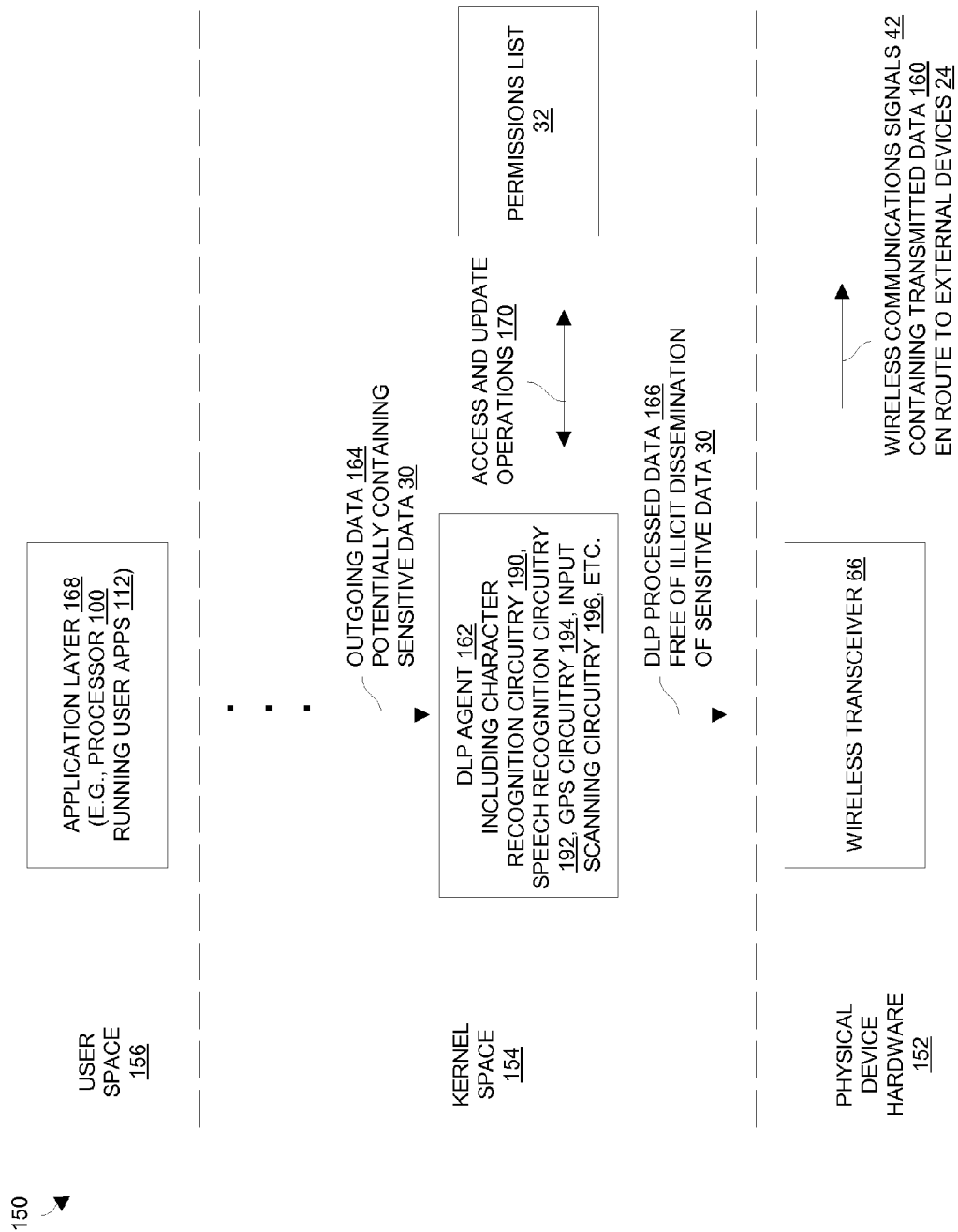
FIG. 3 is a block diagram of a protocol stack which is suitable for use by the mobile wireless communications apparatus of FIG. 2.

FIG. 3 shows a logical depiction of portions of a protocol (or network) stack 150 which is suitable for use by the smart phone 60. As shown, the protocol stack 150 includes a physical device hardware layer 152, a kernel space 154, and a user space 156. As will now be explained, in this context, the DLP circuitry 28 has completed its learning phase and has been configured by the user to operate as an agent that scans for and possibly blocks release of sensitive data 30 if such release is not authorized.

As shown in FIG. 3, the physical device hardware layer 152 includes the wireless transceiver 66 (also see FIG. 2) which enables the smart phone 60 to communicate with the external devices 24 via wireless communications signals 42 (also see FIG. 1). Along these lines, the wireless communications signals 42 include transmitted data 160 from the smart phone 60.

The kernel space 154 includes traditional kernel layers such as a system call interface, and device drivers, among others. The kernel space 154 further includes a DLP agent 162 which scans outgoing data 164 from the user space 156 and provides DLP processed data 166 to the physical device hardware layer 152 which will eventually be outputted as the transmitted data 160 in the wireless communications signals 42. Further details of the DLP agent 162 will be provided shortly.

The user space 156 includes an application layer 168. The user apps 114 (FIG. 2) run in this application layer 168 and such execution may involve carrying out wireless communications sessions with the external devices 24 (e.g., phone calls, transactions, shopping, etc.).

The DLP circuitry 28, which is formed by the processor 100 executing the DLP code 112, operates as the DLP agent 162 to intercept the outgoing data 164 and potentially block sensitive data 30 unless the release of that sensitive data 30 is authorized by the user. To this end, the DLP agent 162 generates the permissions list 32 during the learning phase in which the DLP circuitry 28 searches the smart phone 60 for sensitive data 30, and then receives configuration from the user to control which apps 114 are allowed to send the sensitive data 30. The operations for accessing and updating the permissions list 32 by the DLP agent 162 are represented by the arrow 170. The DLP agent 162 of the DLP circuitry 28 then operates as a filter by scanning the outgoing data 164 and blocking sensitive data 30 within the outgoing data 164 so that the sensitive data 30 is no transmitted by the wireless transceiver 66.

As shown in FIG. 3, the DLP agent 162 includes a variety of specialized filtering circuits such as character recognition circuitry 172, speech recognition circuitry 174, and GPS circuitry 176. The character recognition circuitry 172 is constructed and arranged to perform character recognition operations to scan video files (e.g., pictures, bitmaps, video streams, etc.) for sensitive data 30. Similarly, the speech recognition circuitry 174 is constructed and arranged to perform speech recognition operations to scan audio streams for sensitive data 30. The GPS circuitry 176 is constructed and arranged to scan for location information within the outgoing data 30. Other filtering circuitry is suitable for use as well.

Moreover, it should be understood that the DLP agent 162 is capable of scanning data which is received from other sources such as the external devices 24. In particular, the DLP agent 162 is equipped with input scanning circuitry 178 which, upon configuration by the user, filters incoming data certain types of data such as activation commands. Accordingly, the DLP agent 162 is able to prevent unauthorized activation of a particular smart phone application 114. Such operation is useful in thwarting attempts by an attacker to activate malware, e.g., by blocking an unauthorized text message command from reaching the particular smart phone application 114.

Figure 4:
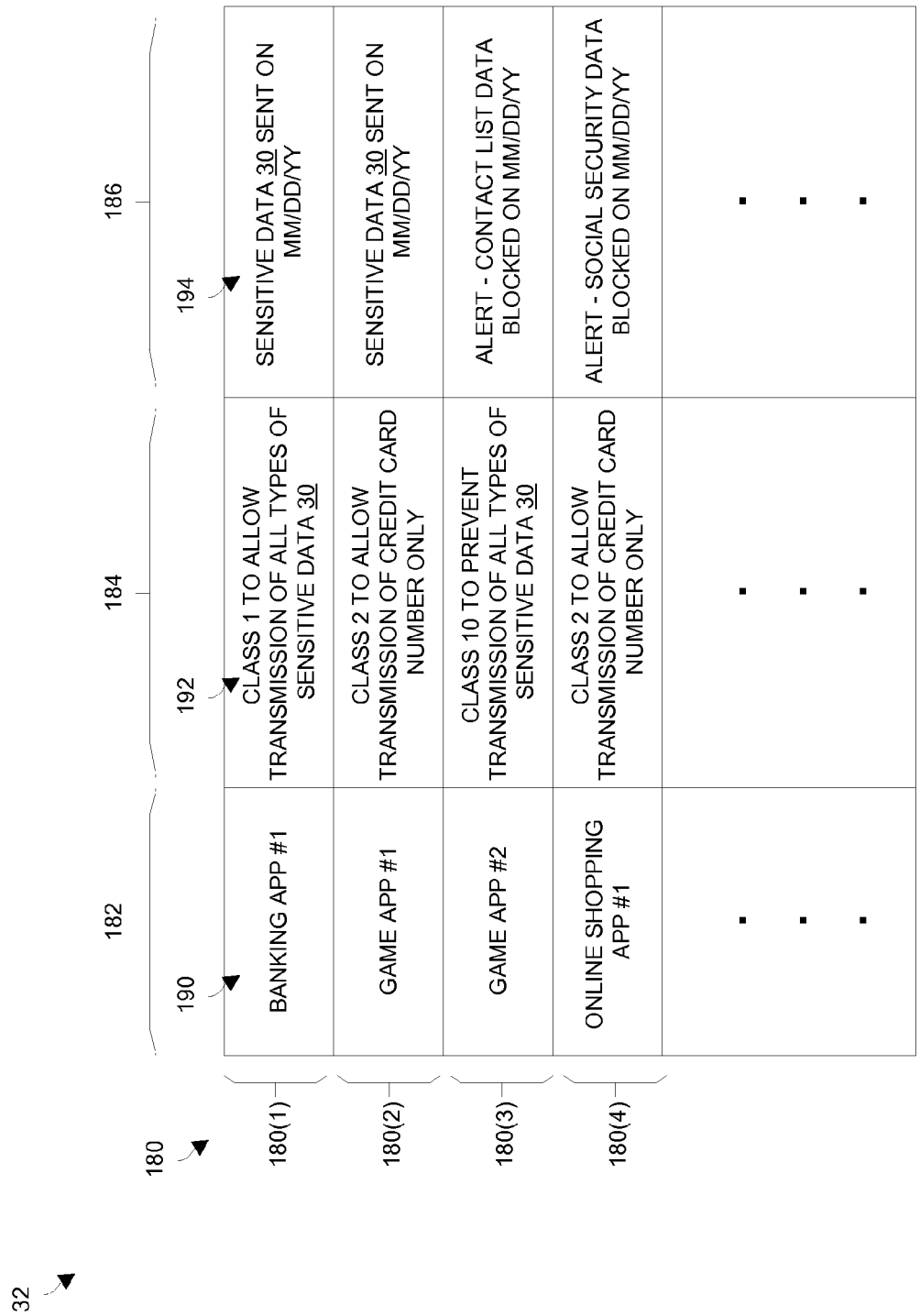
FIG. 4 is a block diagram of permissions list which is suitable for use by the mobile wireless communications apparatus of FIG. 2.

FIG. 4 shows particular details of the permissions list 32. As shown, the permissions list 32 includes a set of smart phone app entries 180(1), 180(2), 180(3), 180(4), . . . (collectively smart phone app entries 180). Each entry 180 includes a smart phone identifier field 182, a class field 184, and additional fields 186.

The smart phone identifier field 182 of each entry 180 is constructed and arranged to store a smart phone app identifier 190 which uniquely identifies the smart phone app 114 to the DLP circuitry 28. For example, a first entry 180 may correspond to a banking application, a second entry 180 may correspond to a game, and so on.

The class field 184 of each entry 180 is constructed and arranged to store a classification (or type) 192 which is assigned by the user and which identifies which types of data are allowed to be transmitted by the smart phone app 114 identified by the smart phone app identifier 190 of that entry 180. For example, a first classification can allow an app 114 to send any sensitive information 30 (e.g., for banking transactions). A second classification can allow an app 114 to send only credit card numbers, names and addresses (e.g., for online shopping). A third classification can prevent an app 114 from sending any sensitive information 30 (e.g., for a game). It should be understood that the character recognition circuitry 172 and the speech recognition circuitry 174 of the DLP agent 162 are available to provide comprehensive and robust scanning of the outgoing data 164.

Other searching classes and scenarios are suitable for use as well. For example, as the DLP agent 162 searches for names, addresses and phone numbers, the DLP agent is able to detect call history information, contact list information, and similar sensitive data 30 in the outgoing data 164.

The additional fields 186 store extra information 194 such as tracking or alert information which enables the user to see which apps 114 attempted to disseminate sensitive information 30. The user can then further configure the operation of the DLP circuitry 28 by changing the classifications for certain apps 114. For example, the user can permit future transmission of the sensitive data 30. Additionally, the user can impose more restrictions on what is transmitted by certain apps 114, and so on. Further details will now be provided with reference to FIG. 5.

Figure 5:
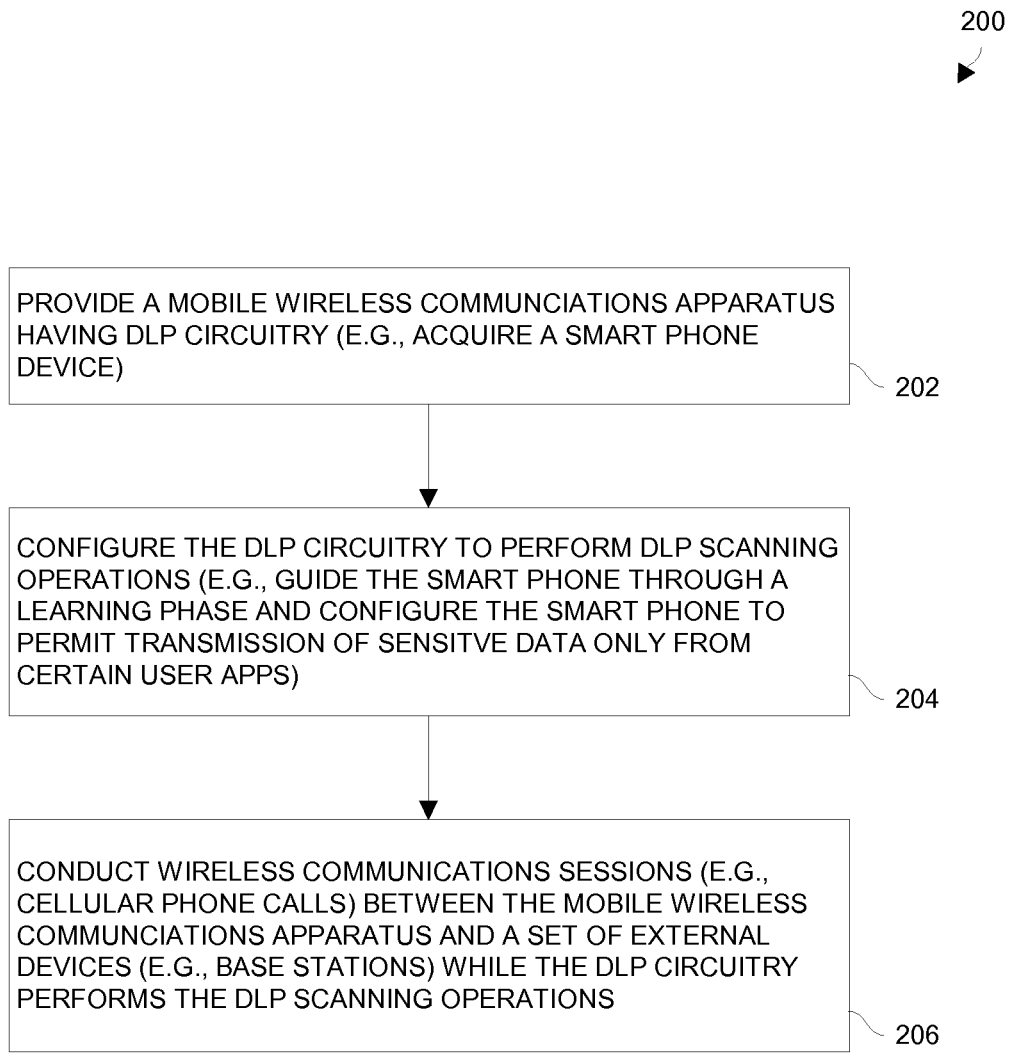
FIG. 5 is a flowchart of a procedure which is performed by a mobile wireless communications apparatus when providing wireless communications security.

FIG. 5 shows a flowchart of a procedure 200 which is performed by a user when providing wireless communications security. In step 202, the user receives mobile wireless communications apparatus 22 having the DLP circuitry 28 (also see FIG. 1). In some arrangements, the user simply obtains a mobile wireless communications apparatus 22 which is already equipped with the DLP circuitry 28. In other arrangements, the user provisions a smart phone 60 with the DLP code 112 (also see FIG. 2).

In step 204, the user configures the DLP circuitry 28 to perform DLP scanning operations. In particular, the user guides the DLP circuitry 28 which searches the apparatus 22 for sensitive data 30 (e.g., credit card numbers, social security numbers, names and addresses, telephone numbers, etc.). The DLP circuitry 28 then provides the results to the user and the user indicates which apps 114 are allowed to send out the sensitive data 30. In some arrangements, the granularity of such user configuration enables the user to direct the DLP circuitry 28 to permit specific classes of sensitive data 30 for transmission by each application (e.g., see FIG. 4).

In step 206, the user conducts wireless communications sessions between the mobile wireless communications apparatus 22 and the external devices 24 while the DLP circuitry 28 performs the DLP scanning operations. In particular, the user is able to make and receive cellular phone calls using the apparatus 22. The user is also able to connect to other servers 26 (FIG. 1) to perform other activities (e.g., banking, shopping, game playing, etc.).

As mentioned above, an improved technique protects a smart phone 60 against unauthorized release of sensitive information 30 by scanning outgoing data 164, which is ready for transmission, for information satisfying certain criteria such as having a particular personally identifiable information (PII) format. Along these lines, the smart phone 60 can be configured to restrict transmission (or retransmission) of certain types (or classes) of data such as credit card numbers, social security numbers, account numbers, etc. but not others. To this end, data loss prevention (DLP) circuitry 28 operates to intercept outgoing user data 164 and possibly block the sensitive information 30 in that data from reaching the wireless transceiver 66 of the smart phone 60.

One should appreciate the advantages provided by the presence of DLP circuitry 28 with the smart phone 60. Recent reports have suggested an alarming trend: up to one third of all of the applications available in a typical apps store employ some form of spyware. Unbeknownst to a legitimate user, these applications actively compromise a user's data. Smart phones are a store of PII, and a user's contacts, call history, location history, e-mails and so on reveal a great deal about a user's movements and social contacts.

In addition, smart phones often themselves contain unique "device identifiers" such as a serial number, Unique Device Identification (UDID), or International Mobile Equipment Identity (IMEI), or values derived from at least part of these or other persistent identifiers. The DLP circuitry 28 is capable of being configured by the user to scan for and block unauthorized transmission of any smart phone device identifier (or similar ID) in the outgoing data 164 (i.e., the payload) without interfering with the smart phone's ability to establish and maintain wireless communications sessions which may use the identifier as part of the wireless communications protocol.

Furthermore, social networking and rich media capture are wonderful tools, but they have the potential to exacerbate this trend. If an application can use the smart phone's GPS to determine location, what is to stop it from relaying this location to advertisers or criminals? Worse still, the cameras and microphones found on board may be used to relay private conversations and images.

With the DLP circuitry 28 in place and properly configured, the DLP circuitry 28 is able to stop the illicit dissemination of sensitive data 30. A clear example is a credit card number that the user may accidentally or nefariously transmit by email. The DLP circuitry 28 prevents this unauthorized transmission by scanning the outgoing data or email for strings that appear to be credit card numbers. Unlike most data, credit card numbers follow a very strict format. This fact can be used by the DLP circuitry 28 to locate and intercept these numbers before they reach the outside world. Clearly, this technology is not limited to credit card numbers. Social Security numbers and even rich media like images may be targeted and intercepted by the DLP circuitry 28.

In some arrangements, the DLP circuitry 28 comes with a set of templates that allow the detection of PII—including but not limited to credit card and Social Security numbers. The DLP agent 162 automatically monitors the protocol stack 150 which includes e-mail and text message interfaces among others to intercept the sensitive data 30 before it is sent anywhere.

Naturally, some applications 114 running on the smart phone 60 have a legitimate need to know some of these types of data 30. The user can configure the DLP agent 162 to allow certain applications 114 to transmit certain classes of data, but not others (e.g., see the permissions list 32 in FIG. 4). For example, a banking application may need to know certain account numbers, but not need to know either credit card numbers or Social Security numbers. In this way, the user can restrict certain classes of data to certain applications 114.

Some attackers may try and thwart the DLP agent 162 by transmitting not the data itself, but an image derived from the data, such as a screenshot. Accordingly, the character recognition circuitry 172 of the DLP agent 162 employs optical character recognition techniques to detect sensitive data 30 even when it is represented in this form.

Similarly, an attacker could use text to speech software to make a surreptitious phone call and have the software enunciate the sensitive data 30 to an accomplice. Here again, the speech recognition circuitry 174 of the DLP agent 162 responds by applying speech recognition techniques to the outgoing audio stream to ensure that no sensitive data 30 is being leaked in this fashion.

Moreover, some data should never be allowed in or out. Recent mobile phone malware such as the Zeus Trojan has used text messages to carry commands from the attacker to the infected handset. A remote command-and-control server 26 could send commands such as "BLOCK ON" or "SET ADMIN." The input scanning circuitry 178 of the DLP agent 162 scans for these sets of commands and intercepts them before the commands are received by malware.

In addition, some data is for user consumption only and not for automatic redistribution. For example, some one-time password systems send a one-time passcode by text message. The intent is to allow a user to type the code into a website accessed via PC. That is, that particular data is "for the user's eyes only" and not for automatic retransmission by malware to a potential Man-in-the-Middle aiming to inject the OTP in her own session. An incoming text message could contain a special header that alerts the DLP agent 162 that its contents are not for automatic retransmission. Thereafter, the DLP agent 162 scans outgoing data and text messages to ensure that the sensitive data is not retransmitted. That is, the special header is essentially a command within the incoming text message which configures the DLP circuitry 28 to scan for and prevent retransmission of an OTP which is carried within the incoming text message.

In addition to template-based matching, the DLP agent 162 interrogates the smart phone 60 to directly discover sensitive data values during the learning phase. These values include the smart phone user's name, telephone number, and e-mail address. As above, these can be grouped into data types and associated with certain smart phone applications 114.

These techniques are also applied to rich media capture. For example, a game application should not be able to access pictures that the user has previously taken. Moreover, a simple gaming application should not be able to access data arising from smart phone sensors, such as GPS, biometric sensors, cameras, or microphones. Thwarting the dissemination of pictures or movies is done by means of inspecting the outgoing data 160 for characteristic JPEG or MPEG structures, etc. Again, only certain applications 114 should be permitted to send these types of rich data.

As described above, detecting attempts by malware to retransmit sensor information in real time can be done probabilistically by periodically sampling the output of the sensors and comparing it to data sent by applications. In this way, the malware is not able to redistribute the live feed streaming from a user's camera or GPS sensor.

While various embodiments of the invention have been particularly shown and described, it will be understood by those skilled in the art that various changes in form and details may be made therein without departing from the spirit and scope of the invention as defined by the appended claims.

For example, the above-mentioned techniques were described above as protecting a smart phone against illicit dissemination of sensitive data 30. These techniques are suitable for protecting other types of portable user devices as well such as personal digital assistants, tablets, electronic book readers, portable music players, portable gaming devices, and other smart controllers and devices.

Additionally, the set of external devices 24 was described above as including cellular base stations among other types of wireless communications devices. It should be understood that the set of external devices 24 can includes other types of mobile telephony base stations as well such as WiFi devices, Bluetooth devices, combinations thereof, and so on.

What is claimed is:

1. A method of providing wireless communications security,
   the method comprising:
   providing a mobile wireless communications apparatus having data loss prevention (DLP) circuitry;
   configuring the DLP circuitry to perform DLP scanning operations; and
   after the DLP circuitry is configured to perform the DLP scanning operations, conducting wireless communications sessions between the mobile wireless communications apparatus and a set of external devices while the DLP circuitry performs the DLP scanning operations;
   wherein the mobile wireless communications apparatus is a smart phone device;
   wherein the set of external devices includes a set of mobile telephony base stations;
   wherein conducting the wireless communications sessions includes maintaining the smart phone device in an operative state to exchange cellular telephony signals with the set of mobile telephony base stations, the DLP circuitry (i) scanning outgoing data which is prepared for transmission to the set of mobile telephony base stations and (ii) controlling whether the outgoing data is transmitted within mobile telephony signals to the set of mobile telephony base stations;
   wherein configuring the DLP circuitry to perform the DLP scanning operations includes:
   guiding the DLP circuitry through a learning phase to discover personally identifiable information (PII) stored in the smart phone device, and to identify a set of PII data formats of the PII; and
   wherein conducting the wireless communications sessions further includes:
   allowing data provided by a first application running on the smart phone device to be transmitted from the smart phone device based on a first security classification assigned to the first application, the data provided by the first application including particular sensitive information, and
   blocking data provided by a second application running on the smart phone device from being transmitted from the smart phone device based on a second security classification assigned to the second application, the data provided by the second application including the particular sensitive information.

2. A method as in claim 1, further comprising:
   after guiding the DLP circuitry through the learning phase and while the smart phone device is maintained in the operative state, directing the DLP circuitry to scan the outgoing data which is prepared for transmission to the set of mobile telephony base stations for user application data having a PII data format of the set of PII data formats, the outgoing data being en route from a set of smart phone user applications running in the smart phone device to transceiver circuitry of the smart phone device.

3. A method as in claim 2 wherein configuring the DLP circuitry to perform the DLP scanning operations further includes:
   generating a permissions list which identifies particular smart phone applications of the set that are allowed to send PII to the set of external devices, and
   storing the permissions list in the smart phone device in a non-volatile manner.

4. A method as in claim 3 wherein generating the permissions list includes:
   creating a set of smart phone application entries, each entry having (i) a smart phone application identifier which identifies a particular smart phone user application, and (ii) a classification which identifies particular PII data formats that are permitted for transmission by that smart phone user application.

5. A method as in claim 2 wherein directing the DLP circuitry to scan the outgoing data which is prepared for transmission to the set of mobile telephony base stations includes:
   directing the DLP circuitry to perform character recognition operations on outgoing video data to detect PII having a PII data format of the set of PII data formats.

6. A method as in claim 2 wherein directing the DLP circuitry to scan the outgoing data which is prepared for transmission to the set of mobile telephony base stations includes:
  directing the DLP circuitry to perform speech recognition operations on outgoing audio data to detect PII having a PII data format of the set of PII data formats.

7. A method as in claim 2 wherein directing the DLP circuitry to scan the outgoing data which is prepared for transmission to the set of mobile telephony base stations includes:
  directing the DLP circuitry to filter the outgoing data for global satellite positioning (GPS) information provided by GPS circuitry of the smart phone device.

8. A method as in claim 2 wherein directing the DLP circuitry to scan the outgoing data which is prepared for transmission to the set of mobile telephony base stations includes:
  directing the DLP circuitry to filter the outgoing data for user contact list information stored within the smart phone device.

9. A method as in claim 2 wherein directing the DLP circuitry to scan the outgoing data which is prepared for transmission to the set of mobile telephony base stations includes:
  directing the DLP circuitry to filter the outgoing data for user call history information stored within the smart phone device.

10. A method as in claim 2 wherein directing the DLP circuitry to scan the outgoing data which is prepared for transmission to the set of mobile telephony base stations includes:
  directing the DLP circuitry to filter the outgoing data for device identifiers corresponding to the smart phone device.

11. A method as in claim 2 wherein directing the DLP circuitry to scan the outgoing data which is prepared for transmission to the set of mobile telephony base stations includes:
  directing the DLP circuitry to perform character recognition operations on outgoing video data to detect PII having a PII data format of the set of PII data formats,
  directing the DLP circuitry to perform speech recognition operations on outgoing audio data to detect PII having a PII data format of the set of PII data formats,
  directing the DLP circuitry to filter the outgoing data for global satellite positioning (GPS) information provided by GPS circuitry of the smart phone device,
  directing the DLP circuitry to filter the outgoing data for user contact list information stored within the smart phone device, and
  directing the DLP circuitry to filter the outgoing data for user call history information stored within the smart phone device.

12. A method as in claim 2 wherein configuring the DLP circuitry to perform DLP scanning operations further includes:
  directing the DLP circuitry to filter incoming data for a set of commands to prevent unauthorized activation of a particular smart phone application.

13. A method as in claim 12 wherein directing the DLP circuitry to filter incoming data includes:
  instructing the DLP circuitry to performing text message scanning operations to block an unauthorized text message command from reaching the particular smart phone application.

14. A method as in claim 2 wherein configuring the DLP circuitry to perform DLP scanning operations further includes:
  directing the DLP circuitry to obtain from incoming data a set of commands to configure the DLP circuitry.

15. A method as in claim 2 wherein providing the mobile wireless communications apparatus having the DLP circuitry includes:
  installing DLP code within the smart phone device, a processor of the smart phone device forming the DLP circuitry when executing the deployed DLP code.

16. A method as in claim 1 wherein the first security classification is assigned to the first application during the learning phase.

17. A method as in claim 16 wherein the second security classification is assigned to the second application during the learning phase.

18. A mobile wireless communications apparatus, comprising:
  a mobile wireless communications interface;
  a user interface; and
  a controller coupled to the mobile wireless communications interface and the user interface, the controller being constructed and arranged to:
    receive user input from a user and provide user output to the user through the user interface, and
    in response to the user input from the user, (i) perform data loss prevention (DLP) scanning operations, and (ii) conduct wireless communications sessions with a set of external devices while the DLP scanning operations are performed;
  wherein the set of external devices includes a set of cellular telephony base stations;
  wherein the mobile wireless communications interface is a cellular telephony transceiver;
  wherein the user interface is a smart phone interface;
  wherein the mobile wireless communications apparatus is a smart phone device which further comprises a smart phone housing that houses (i) the cellular telephony transceiver, (ii) the smart phone interface, and (iii) the controller, the smart phone housing being constructed and arranged to be concurrently hand held and operated by the user to carry out cellular telephone calls;
  wherein the controller is constructed and arranged to maintain the smart phone device in an operative state to exchange cellular telephony signals with the set of cellular telephony base stations through the cellular telephony transceiver, the controller (i) scanning outgoing data which is prepared for transmission to the set of cellular telephony base stations and (ii) controlling whether the outgoing data is transmitted within cellular telephony signals to the set of cellular telephony base stations; and
  wherein the controller is constructed and arranged to be guided by the user through a learning phase to discover personally identifiable information (PII) stored in the smart phone device, and to identify a set of PII data formats of the PII; and
  wherein the controller, when performing the DLP scanning operations and conducting the wireless communications sessions, is constructed and arranged to:
    allow data provided by a first application running on the smart phone device to be transmitted from the smart phone device based on a first security classification assigned to the first application, the data provided by the first application including particular sensitive information, and block data provided by a second application running on the smart phone device from being transmitted from the smart phone device based on a second security classification assigned to the second application, the data provided by the second application including the particular sensitive information.

19. A mobile wireless communications apparatus as in claim 18 wherein the controller is constructed and arranged to scan the outgoing data which is prepared for transmission to the set of cellular telephony base stations for user application data having a PII data format of the set of PII data formats, the outgoing data being en route from a set of smart phone user applications running in the smart phone device to the cellular telephony transceiver of the smart phone device.

20. A computer program product having a non-transitory computer readable storage medium which includes instructions to provide wireless communications security to a smart phone device, the instructions directing the smart phone device to:

receive user input from a user and provide user output to the user through a smart phone user interface, configure the smart phone device to perform data loss prevention (DLP) scanning operations by guiding the smart phone device through a learning phase to discover personally identifiable information (PII) stored in the smart phone device and to identify a set of PII data formats of the PII, and in response to the user input from the user and after configuring the smart phone device, (i) perform DLP scanning operations, and (ii) conduct wireless communications sessions with a set of cellular telephony base stations while the DLP scanning operations are performed;

wherein the smart phone device, when performing the DLP scanning operations and conducting the wireless communications sessions:

allows data provided by a first application running on the smart phone device to be transmitted from the smart phone device based on a first security classification assigned to the first application, the data provided by the first application including particular sensitive information, and blocks data provided by a second application running on the smart phone device from being transmitted from the smart phone device based on a second security classification assigned to the second application, the data provided by the second application including the particular sensitive information.

* * * * *